Dec. 23, 1941.   W. T. CRIGHTON   2,267,081
APPARATUS FOR PRODUCING BUTTERFAT
Filed Sept. 3, 1938
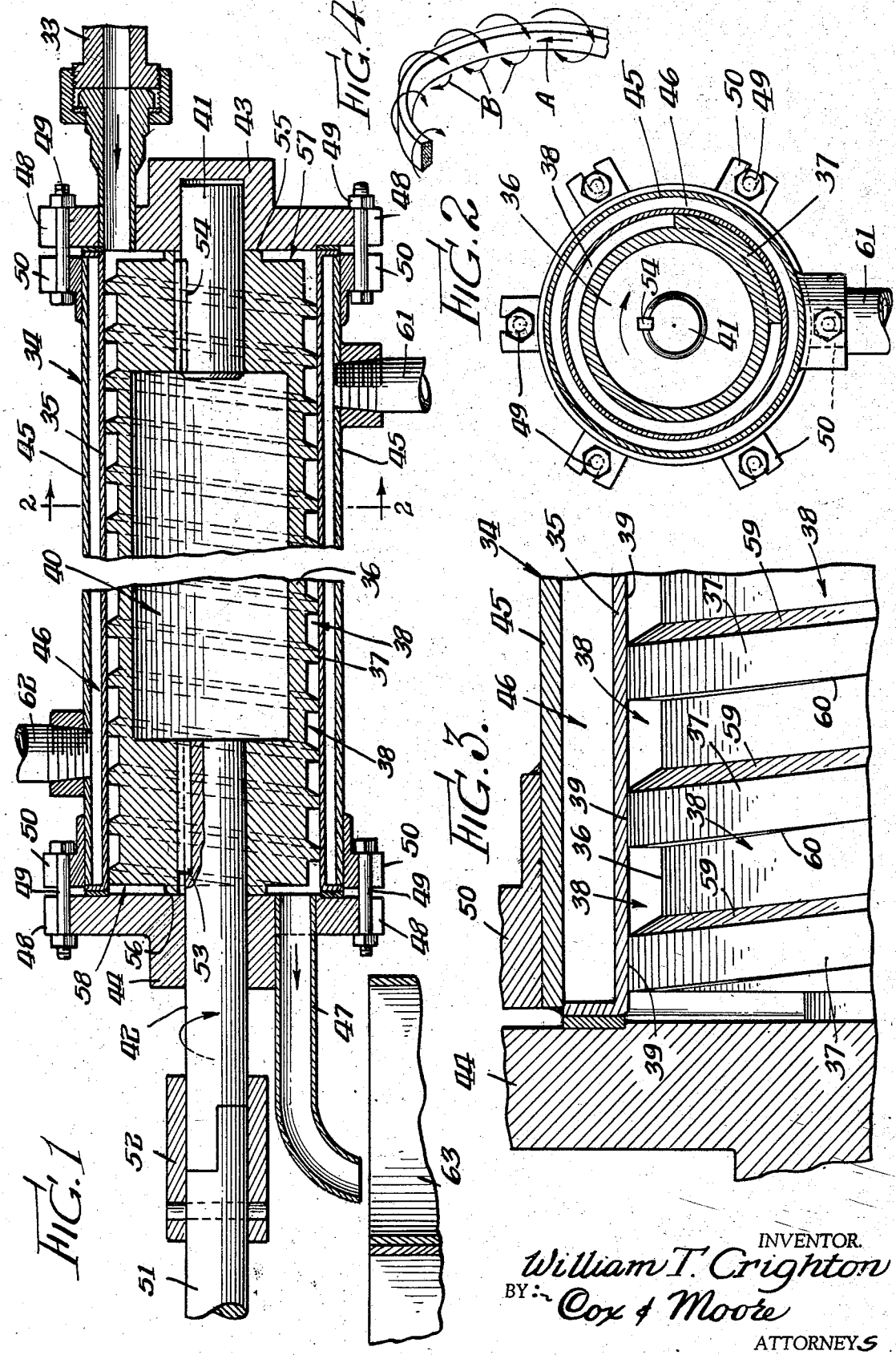
INVENTOR.
William T. Crighton
BY Cox & Moore
ATTORNEYS Patented Dec. 23, 1941

2,267,081

UNITED STATES PATENT OFFICE 2,267,081

APPARATUS FOR PRODUCING BUTTERFAT

William T. Crighton, Springfield, Mo., assignor to Producers Creamery Company, Springfield, Mo., a corporation of Missouri Application September 3, 1938, Serial No. 228,343

1 Claim. (Cl. 257—86)

This invention relates to an apparatus for producing cream having a high content of butter-fat.

The primary object of the present invention is the provision of new and improved means for treating cream having a high butter-fat content so as to provide a product of exceptional quality.

Another important object of the invention resides in a new and novel cooling apparatus whereby cream containing a very high content of butter-fat is fed by means of a screw element of a particular type and construction so that the cream will be constantly caused to flow against the inside walls of a cooling jacket, so that the cream will be continuously kept moving but there will be no churning effect of the cream so as not to break the surface tension of the fat globules.

This present application relates to and claims an apparatus for cooling cream having a high content of butter-fat. Applicant's co-pending application Serial Number 391,940, filed May 5, 1941, relates to and claims the method of cooling cream having a high content of butter-fat.

Numerous other objects and advantages will be apparent throughout the progress of the following specification.

The accompanying drawing illustrates a selected embodiment of the invention and the views therein are as follows:

Fig. 1 is a longitudinal sectional view of the cooling element and embodying the invention;

Fig. 2 is a detail sectional view on the line 2—2 of Fig. 1;

Fig. 3 is a detail sectional view of a part of the improved cooling apparatus, being drawn the full size scale of an actual embodiment; and Fig. 4 is a diagrammatic view showing the path of travel of the cream in the cooler.

The cooler element 34, Fig. 1, comprises a cylinder 35 with which the pipe line 33 has communication. Inside the cylinder 35 there is mounted a cylindrical member 36 having a single spirally positioned, spaced, outwardly extending continuous rib 37. The rib 37 extends continuously about the member 36 in a fashion similar to that in which the thread spirals about the core or body of a screw and is, in effect, a screw thread, there being a space 38 between each convolution of the rib or thread 37. The rib or thread 37 extends to the inside wall of the cylinder 35, as indicated at 39, Fig. 3. In other words, the outer periphery of the thread or spiral engages the inside surface of the cylinder 35 so as to prevent the material from seeping through between the wall and the contacting surface, but not so tight as to cause any friction. The member 36 may be made in one or more sections as desired, and preferably has its central portion hollow as indicated at 40, Fig. 1, so as to reduce the weight of the structure. The ends of the cylindrical member 36 have shafts 41 and 42, Fig. 1, supported in bearings 43 and 44, respectively, to revolubly or rotatably support the structure. A jacket 45 encases the cylindrical member 35 and is spaced from the walls thereof to provide a fluid passage 46 into which a cooling medium, such as brine, refrigerated water, or the like, is fed to cool the walls of the cylinder 35.

The pipe line 33 has communication with the interior of the cylinder 35 at one end thereof, and a discharge pipe line 47 leads from the opposite end of the cylinder 35. It is preferable that the inlet line 33 enter the cylinder at the top thereof, while the discharge line 47 leave the cylinder at the bottom thereof, as clearly shown in Fig. 1.

The bearing members 43 and 44 are constructed to provide end caps or end closures for the cooling element 34, the members 43 and 44 each being provided with wings or extensions 48 to receive the locking bolts 49. The locking bolts 49 also engage complementary wings or extensions 50 properly fixed and fastened to the outer wall of the jacket 45.

A shaft 51 driven by a prime mover, such as an electric motor, rotates the shaft 42 in any suitable manner, such as by the connection 52, Fig. 1. The shaft 42 is fixed to the member 36 in any suitable manner, such as by a key 53, so that rotation of the shaft 42 will cause rotation of the member 36. If desired, the shaft 41 may also be fixed to the member 36 by means of a key 54. The extreme ends of the member 36 engage the members 43 and 44, as indicated at 55 and 56, but the member 36 is cut away at each end to provide the peripheral grooves 57 and 58 to provide spaces respectively for the reception of the material as it enters and leaves the cooling member 34, Fig. 1.

The rib 37 which spirally encircles the body 36 and is preferably made integral therewith, has one edge cut away or beveled or inclined, as indicated at 59, Fig. 3, and its other edge extending up relatively straight, as indicated at 60. The distance of the body member 36 from the inside of the cylinder 35 is relatively shallow and provides the space 38 into which the cream is received. During operation, that is, rotation of the body 36, the cream is caused to contact with the inner peripheral surface of the inner cylinder 35, and due to the straight edge 60 on one side of the tooth or rib and the inclined or beveled surface 59 on the other side of the tooth or rib, the cream will tend to roll about, that is, the cream will not only be caused to follow a continuous spiral path from one end of the cooler to the other and about the periphery of the member 36, as indicated by the directional arrow A, Fig. 4, but it will also be caused to rotate about an axis centrally disposed about the space between the teeth, as shown by the directional arrows B, Fig. 4. Furthermore, the provision of the inclined surface 59 and the straight surface 60 prevents pockets into which the material would be jammed and remain stationary. Therefore, during rotation of the member 36 the cream will be translated along its spiral path as indicated by the directional arrow A, Fig. 4, as well as be rotated in an orbit in the space between the teeth as shown by the directional arrows B, Fig. 4, so as to cause every particle of cream in the spaces between the ribs 37 to come into contact with the inner surface of the cylinder 35. The particular construction of the teeth or ribs is such that the material will flow freely from one end of the cooler to the other and at the same time assume a rotary action, Fig. 4, but still not be compressed or churned, and the fat globules will be maintained in their original condition and surface tension and will not become broken, thereby distinguishing the particular action employed from a churning action which would destroy or break down the fat globules of which cream is formed.

A pipe line 61, Fig. 1, leads to the space 46 between the cylinder 35 and the outer jacket 45 which surrounds the cylinder and has communication with the space 46. This pipe line 61 is connected to the bottom of the cooling device 34 and is the inlet for refrigerant, such as brine, refrigerated water, or the like, to supply refrigerant to the space 46 entirely surrounding the cylinder 35. This pipe line is positioned at the point where the cream enters the cylinder 35 through the inlet 33 and supplies the cold refrigerant at the point where the material is first received into the cooler 34. An outlet 62, Fig. 1, for the refrigerant is located at the top of the cooler 34 adjacent the discharge end thereof, and the refrigerant which passes through the line 61 will completely encircle the cylinder 35 to cool the walls thereof and is then discharged out through the discharge pipe 62. The space 46 between the outer jacket 45 and the outer walls of the inner cylinder 35 is relatively small so as positively to cause the refrigerant fluid to circulate in a spiral fashion throughout the entire length of the cylinder 35. If the space 46 were not relatively small, the fluid would have a tendency to surge into the system, probably along the bottom thereof, and discharge through the pipe 62 without completely encircling and flowing spirally about the cylinder.

The structure disclosed in Fig. 3 is a full size detail of an actual embodiment which is in actual operation, and shows the spacing and sizes of the device which is in commercial use. The actual cooler 34 which is in operation has the conveyor element approximately 68 inches long and 6 inches in diameter. There is one single spiral coil 37 which constitutes 56 ribs 37 spaced approximately 1¼ inches apart. The wall of the inner cylinder 35 is approximately ⅛ of an inch thick, while the outside wall 45 is approximately 1/16 of an inch thick. The space 46 between the walls 35 and 45 is approximately ½ inch. The space along the core between adjacent ribs or teeth 37 is approximately ⅝ of an inch, the distance across the top of the teeth or ribs 37 being ½ inch. The inclined surface 59 is approximately 1/32 of an inch wide, measured horizontally. The space 38 between the outside body of the core 36 to the inside edge of the cylinder 35 is approximately 1/16 of an inch. The bevel 59, which is the beveled portion connecting the left hand edge of each of the lands of the rib 37 to the core 36, Fig. 3, makes an acute angle of approximately 30 degrees with the radial direction, while the opposite edge where the land of the rib or tooth 37 connects with the core 36, is relatively a right angle with respect to the core. This rib construction causes the material to be forced longitudinally of the cooler and causes the material to turn as it is being fed along the convolutions between the ribs and prevents and overcomes any pockets from forming and prevents the fat globules from becoming disintegrated.

The 80% cream which enters into the cooling device 34 from the pipe 33 is at a temperature of approximately from 110° to 120° Fahrenheit, while the cooling medium which enters the pipe line 61 is approximately 30° Fahrenheit, so that proper cooling of the cream as it passes through the cooling conveyor 34 will be effected and the cream will be discharged out of the discharge outlet at a temperature somewhere between 55° and 70° Fahrenheit.

The sizes, dimensions and temperatures here-in given relate to an actual operating device, and while they are not critical to the proper operation of the structure, they are given for the purpose of disclosing an actual commercial embodiment which is in successful operation. Naturally, the sizes may be varied to suit the requirements at hand, but it is desirable that the space between the teeth or ribs and the inside wall of the inner cylinder 35 be relatively thin, as indicated, so that the cream as it passes in the convolute spaces between the ribs will become thoroughly cooled at the proper temperature to provide material of the proper consistency.

Receptacles 63 are located adjacent the discharge pipe 47 to receive the material fed through the cooler 34. As soon as a receptacle receives the proper amount of material, it is immediately closed and is ready for shipment and storage purposes.

The invention provides an apparatus in which cream having a relatively high butter-fat content is caused to be chilled and cooled properly, and because of the particular construction of the apparatus, the cream during its passage through the apparatus is discharged at the proper consistency.

Changes may be made in the form, construction and arrangement of the parts without departing from the spirit of the invention or sacrificing any of its advantages, and the right is hereby reserved to make all such changes as fairly fall within the scope of the following claim.

The invention is hereby claimed as follows:

An apparatus for cooling cream having a high content of butter fat, comprising a cylinder having an inlet for receiving cream under pressure, a cylindrical core mounted concentrically within the cylinder, said cylindrical core being provided with a single upstanding helical thread of uniform dimensions wound spirally thereabout from one end of the core to the other, the radial cross-sectional area of the thread being substantially equal to the radial cross-sectional area of the space between adjacent threads, the leading side of the thread being relatively straight-walled and the trailing side extending rearwardly at an appreciable angle, with the lands of the thread being flat and of appreciable width for engagement with the inside walls of the cylinder, and the surface of the core lying between adjacent threads being flat and of the same approximate width as the width of the lands, together with means for rotating the core, means for cooling the inner surface of the cylinder, and an outlet in the cylinder for discharging the cooled cream therefrom.

WILLIAM T. CRIGHTON.